United States Patent [19]
Stringer

[11] Patent Number: 5,564,720
[45] Date of Patent: Oct. 15, 1996

[54] PORTABLE GAME CART

[76] Inventor: Russell L. Stringer, 6293 Danbury Way, San Diego, Calif. 92120

[21] Appl. No.: 275,628

[22] Filed: Jul. 13, 1994

[51] Int. Cl.[6] ............................................. B62B 1/04
[52] U.S. Cl. ..................... 280/30; 224/153; 224/262; 280/654; 280/47.18; 280/47.27
[58] Field of Search ..................... 280/30, 47.24, 280/47.27, 47.29, 651, 652, 654, 655, 47.17, 47.18; 224/153, 210, 211, 212, 261, 262, 263

[56] References Cited

U.S. PATENT DOCUMENTS

| | | | |
|---|---|---|---|
| 2,490,189 | 12/1949 | Alexander | 280/47.27 X |
| 3,073,614 | 1/1963 | Zinneman | 280/30 |
| 3,430,972 | 3/1969 | Fiedler | 280/30 |
| 4,235,449 | 11/1980 | Tarran | 280/30 |
| 4,362,307 | 12/1982 | Nakatani | 280/30 |
| 4,373,737 | 2/1983 | Carrier | 280/30 |
| 4,582,165 | 4/1986 | Latini | 280/30 X |
| 4,747,526 | 5/1988 | Launes | 280/30 X |
| 4,763,911 | 8/1988 | Gebhard et al. | 280/642 X |
| 4,784,405 | 11/1988 | Stein | 280/47.29 X |
| 5,072,958 | 12/1991 | Young | 280/47.29 X |

OTHER PUBLICATIONS

The Mule Game Carrier Cabela's Magazine–Autumn 94 p. 187.
The Pony Game Carrier Cabela's Magazine–Autumn 94 p. 187.
The Horse Game Carrier Cabela's Magazine–Autumn 94 p. 187.

*Primary Examiner*—Eric D. Culbreth
*Assistant Examiner*—Michael Mar
*Attorney, Agent, or Firm*—Thomas J. Tighe

[57] ABSTRACT

A lightweight, portable wheeled game cart can be compacted, as by folding, and attached to a shoulder harness so that it can be carried by a person on his or her back as if a backpack frame. This allows for easy transport of the compacted cart, and any gear attached to it, to a hunting site. In the preferred embodiment, the cart has a lever length in the form of an elongated frame for lifting and supporting game, and a pair of wheels to provide a rolling fulcrum, the frame being hinged in generally the middle. By removing the shoulder harness and unfolding the frame, the pack frame transforms into a cart. A person may then transport game and/or rescue victims from remote areas.

3 Claims, 5 Drawing Sheets

PORTABLE GAME CART

BACKGROUND OF THE INVENTION

This invention relates in general to an improved cart for transporting gear to, and game from, a hunting site, or in the use of rescue operations in wilderness areas.

It is often necessary for hunters to travel great distances into remote areas in search of deer and other heavy game. Most hunters transport their game by carrying or dragging it on the ground. There is also the problem of the gear the hunters brought to the hunt site; it too must be transported from the hunt site. Because of the weight of such animals and the distance of travel, these methods are less than satisfactory.

Previously known game carts are heavy, too bulky, or must be assembled at the hunt site. And, in many cases the hunter must return to a vehicle to get the game cart and then back to the hunt site. For these reasons previously known game carts are not practical and rarely used.

Other advantages and attributes of this invention will be readily discernable upon a reading of the text hereinafter.

SUMMARY OF THE INVENTION

The present invention overcomes the above-mentioned disadvantages of the previously known game carts by being light weight and can be carried as a backpack to the hunt site. Then by removing the shoulder harness, it opens into a cart that can transport game from the hunt site.

These objects, and other objects expressed or implied in this document, are accomplished by a land cart having a rolling support for carrying an object thereon, the rolling support being light enough to be carried by a person, means for compacting the rolling support, and means for attaching a compacted rolling support to the person for walking transport of same. The rolling support can be lever means for lifting and supporting objects thereon, handle means for grasping the lever means, and wheel means, affixed to the lever means, for providing a rolling fulcrum. In a preferred embodiment the game cart can comprise two side rail member sets with cross members and a locking hinge between each of the two rail member sets, attaching the two rail member sets together. At the end of one rail member set, remote from the hinge, there is a raised cross member and an axle brace for the wheels. At the end of the other side rail member set, remote from the hinge, there are a pair of laterally offset, curved handles. The curvature of the handles allows them to extend around the wheels when cart frame is in a closed, i.e. folded state. In a fully opened state the game cart has a ladder-like frame on which game can be attached and levered. In the closed state the cart frame resembles a backpack frame. By adding a detachable shoulder harness the cart can be easily carried on the back of a person and can also be used to carry additional gear.

DESCRIPTION OF THE PREFERRED EMBODIMENT

Figure 1:
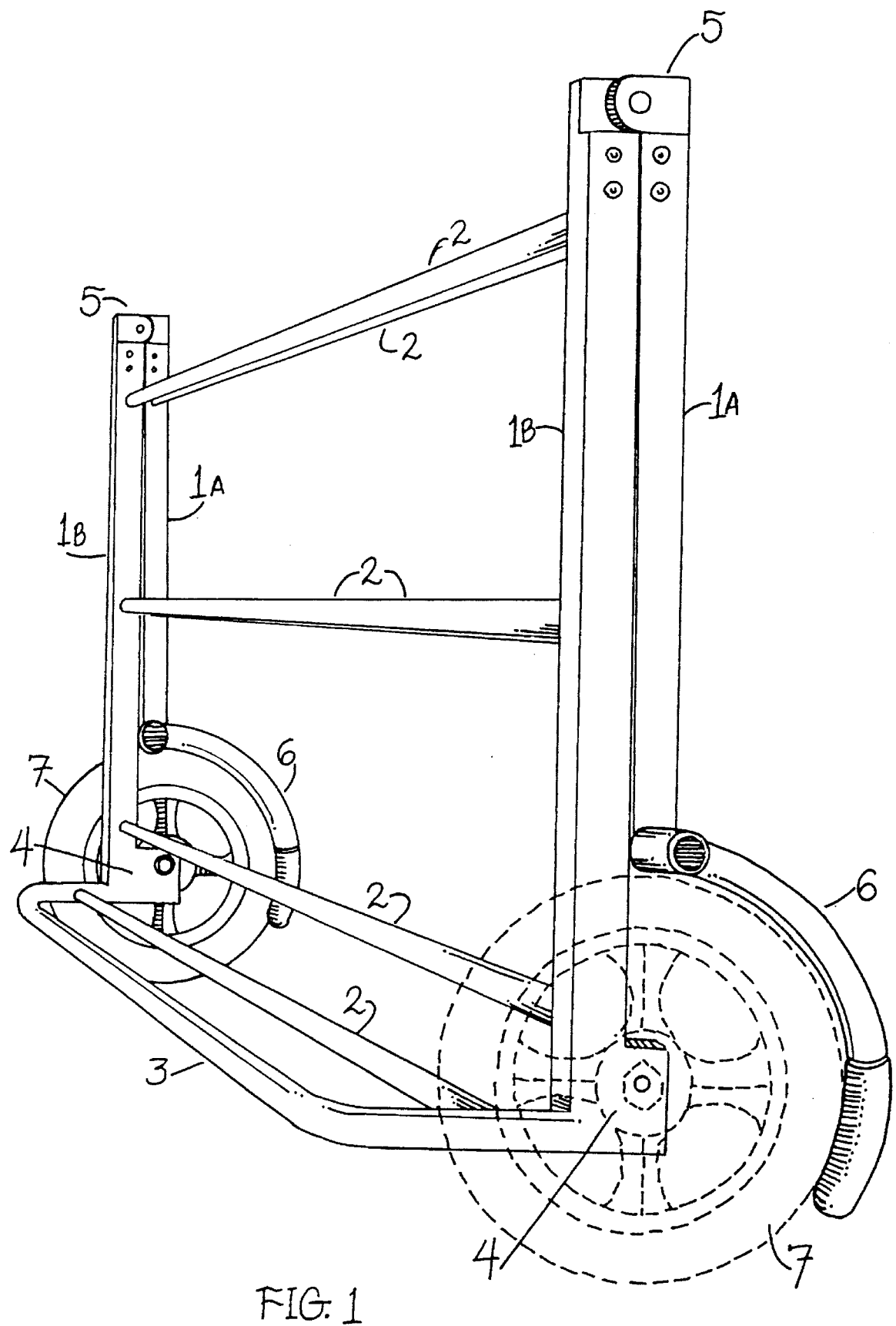
FIG. 1 is a perspective view of the game cart, showing the present invention in a closed state.
Figure 2:
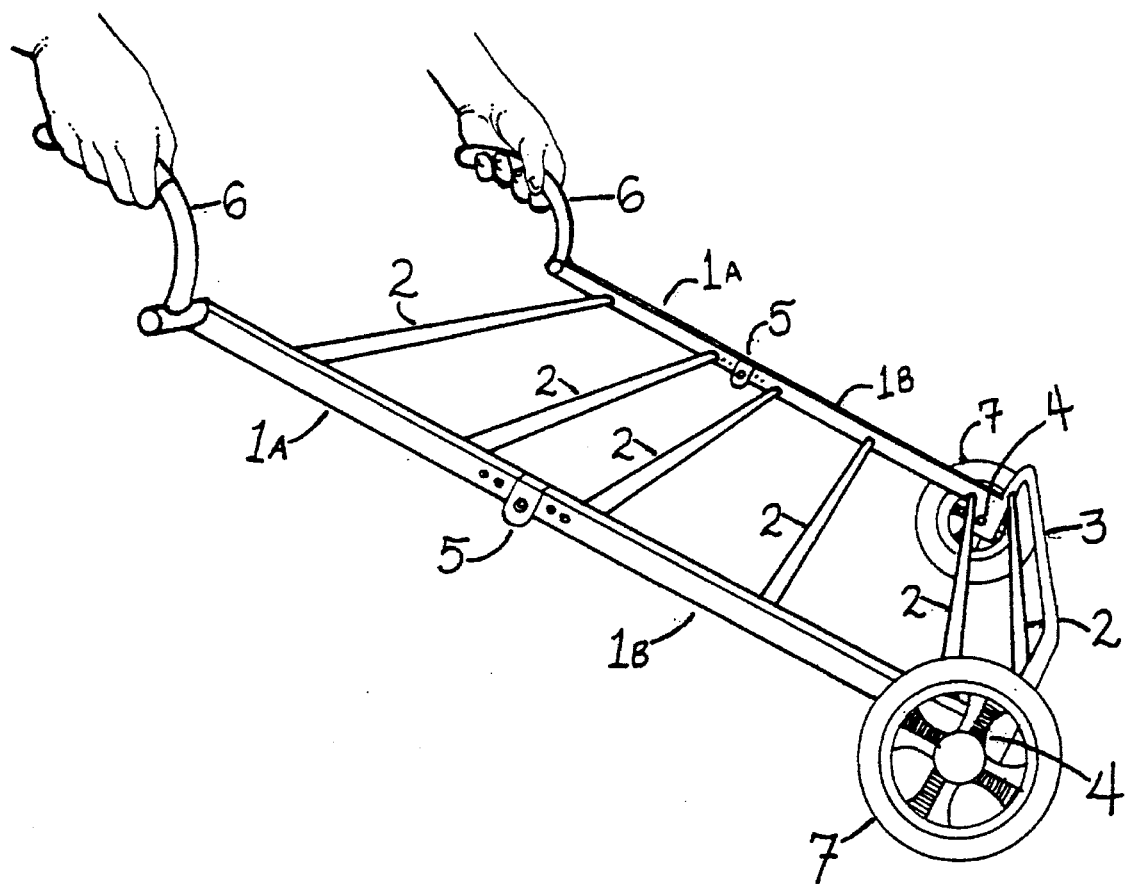
FIG. 2 is a perspective view of the game cart, showing the present invention in an open state.

With reference first to FIGS. 1 and 2, the preferred embodiment of the game cart of the present invention is illustrated as having four side rail members, two shown as 1A and two shown as 1B. Rail members 1B have four cross members 2 and one raised cross member 3 for support and strength. Rail members 1B also have two solid axle plates 4, which connect with cross member 3. The wheels 7 have independent axles that attach to axle plates 4.

Rail members 1A have two cross members 2. Rail members 1A also have two open end handles 6. The handles 6 have been designed to be laterally offset from respective side rails to which they are affixed and curved as to follow the contour of wheels 7.

Rail members 1A and 1B are connected together by a pair of hinges 5 that are locking type hinges that will only open to 180 degrees. Because the hinges each have an offset centerpoint, the side rail members 1A and 1B can be selectively closed flush together as illustrated in FIG. 1, or locked open in alignment as illustrated in FIG. 2.

Figure 3:
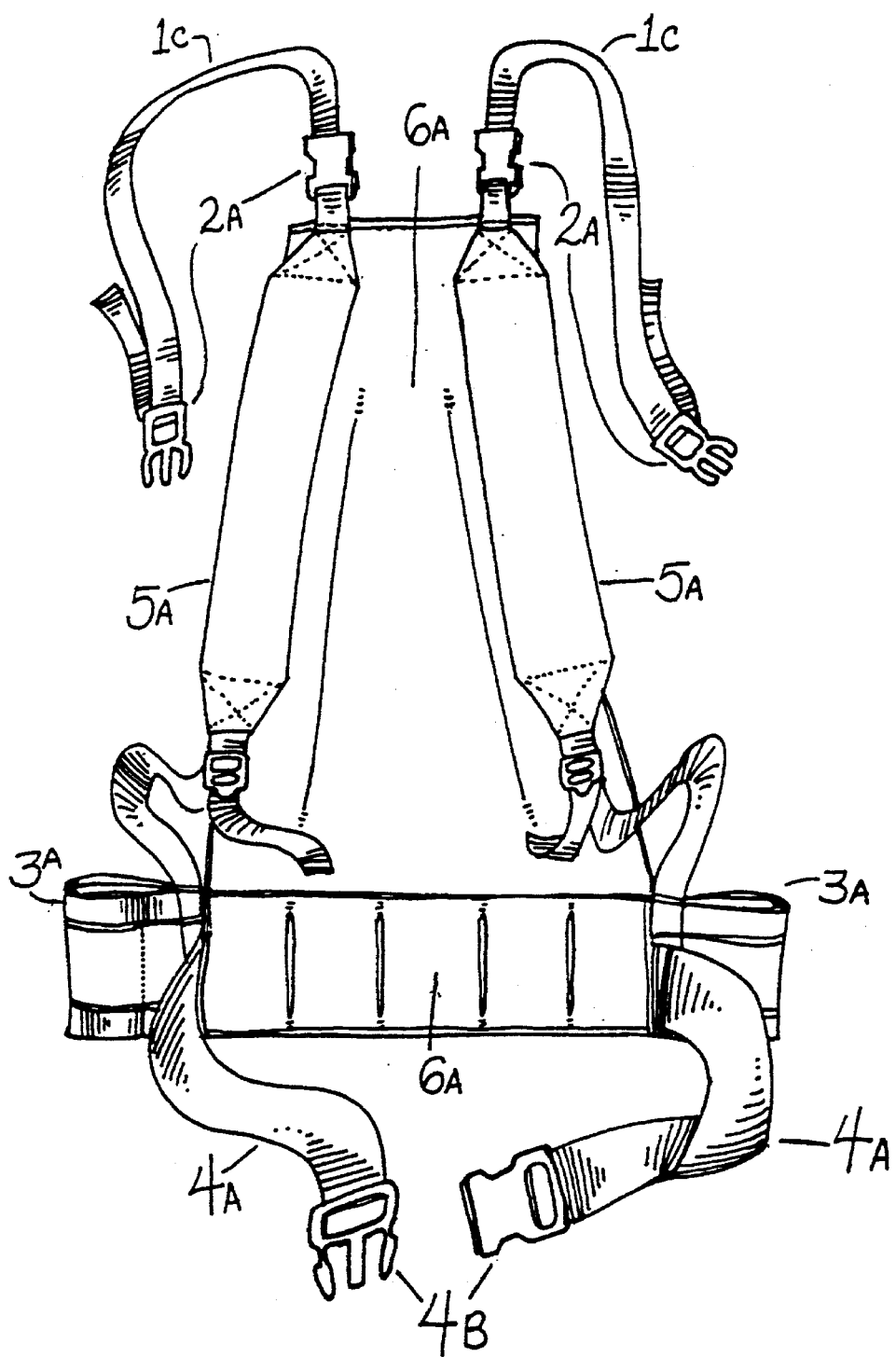
FIG. 3 is a perspective view of the shoulder harness, of the present invention.
Figure 4:
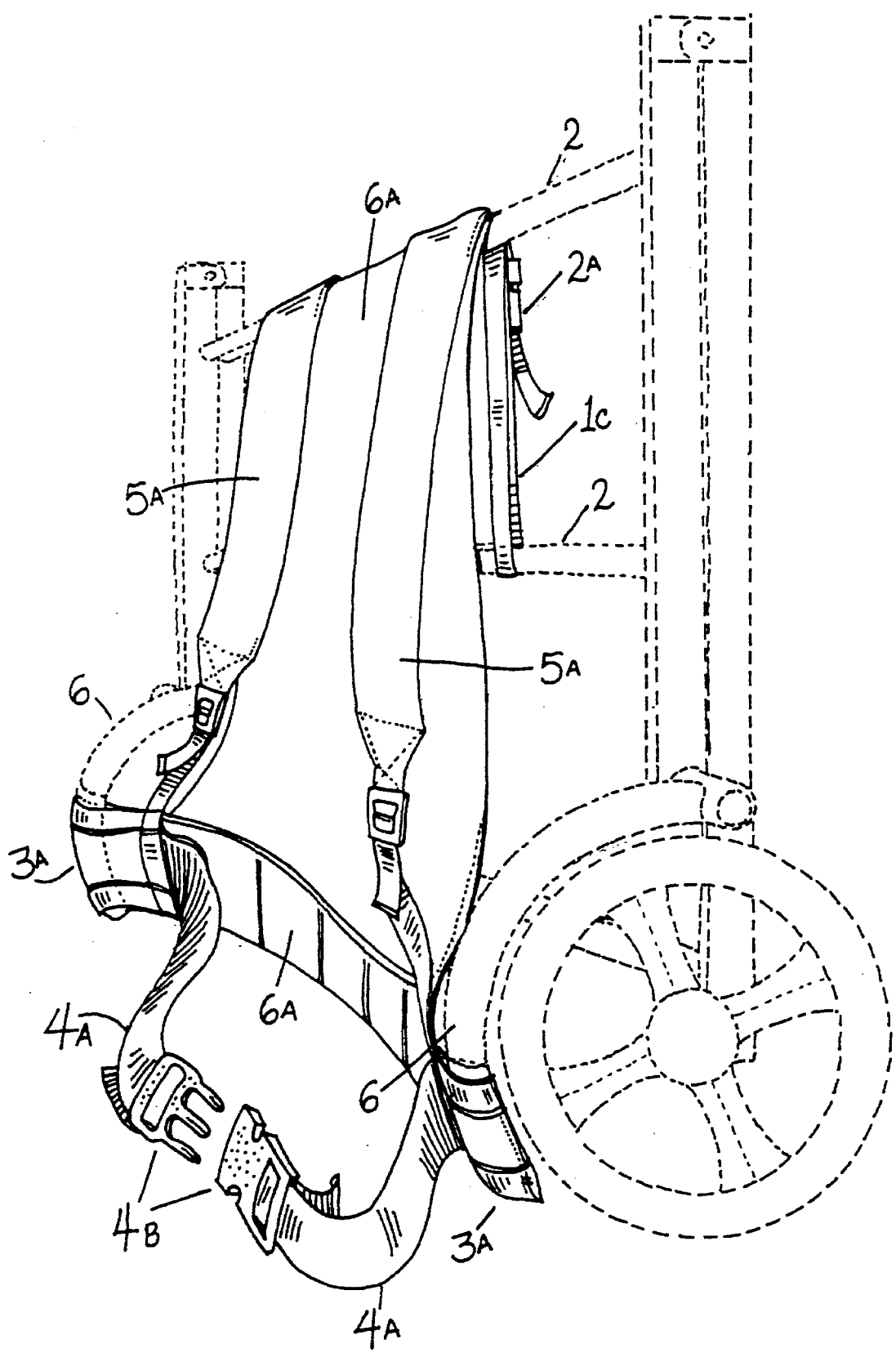
FIG. 4 is a view of the shoulder harness attached to the frame of the game cart.

With reference to FIGS. 3 and 4, a preferred embodiment of the shoulder harness of the present invention is illustrated to have a single-body unit with several straps, belts, and sleeves that attach to the closed game cart of the present invention. Item 6A is the main back and waist support of the shoulder harness. Items 1C, as shown in FIG. 3, are two attachment straps that wrap around cross members 2 as shown in FIG. 4. Items 1C then snap together by a buckle 2A. Items 3A are two sleeve type pockets at the bottom of 6A that slip over the ends of 6 of the curved handles as shown in FIG. 4. Thus by attaching the cross member straps 1C and the handle sleeves 3A of the shoulder harness to the game cart frame, the unit becomes a backpack frame which can be easily carried, and to which additional gear can be attached also for being carried.

Figure 5:
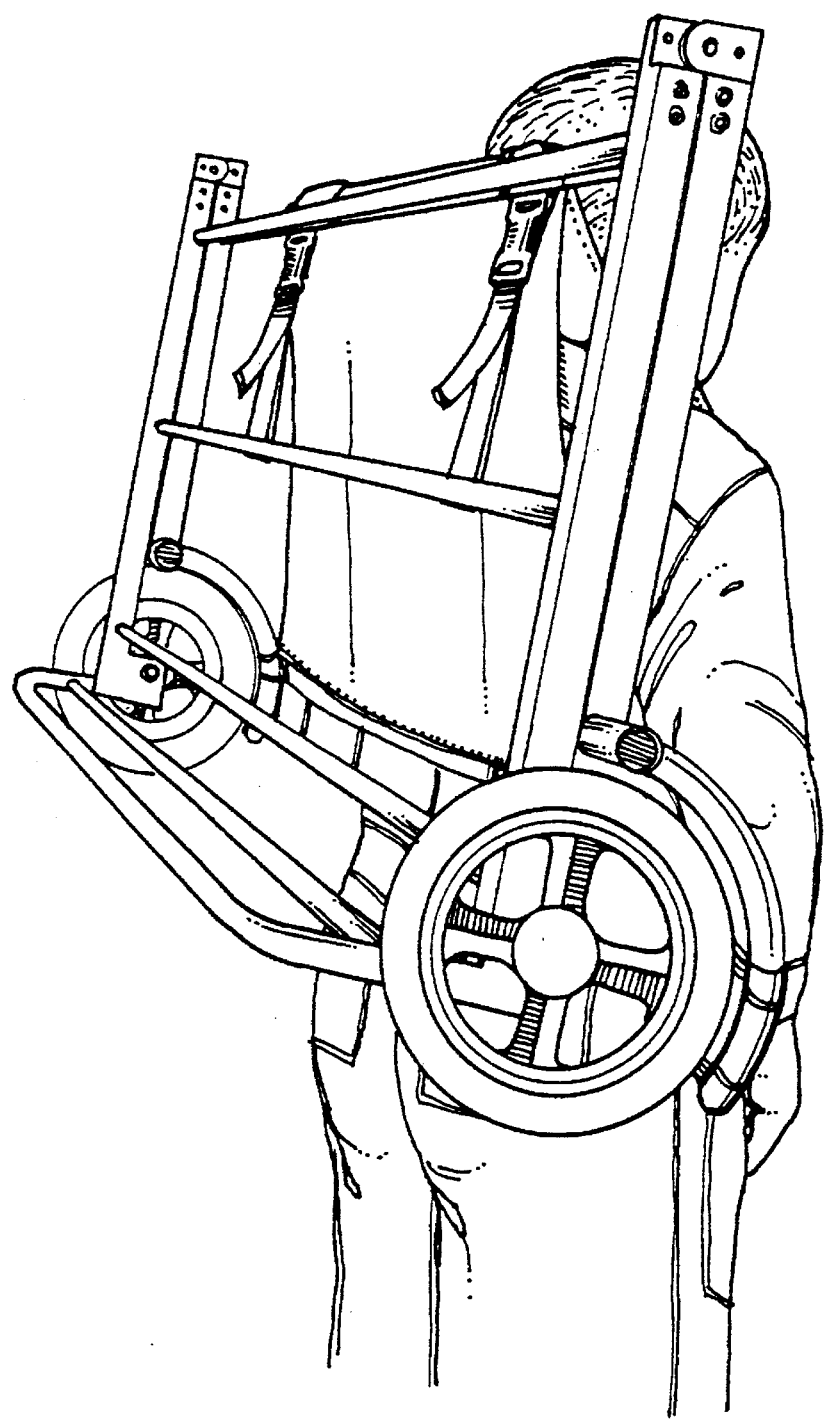
FIG. 5 is a view of the game cart with shoulder harness attached and being carried.

Referring again to FIGS. 3 and 4, items 5A are two adjustable shoulder straps which allow a person to carry the game cart. Items 4A are two adjustable waist straps that snap together by 4B. The waist straps 4A help to to fit the cart securely against the body when being carried. FIG. 5 shows the present invention in a folded state with shoulder harness attached and being carried on the body in the backpack mode.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A land cart comprising:
   (a) an elongated frame including an upper frame section, a lower frame section, and a pair of aligned laterally spaced frame members;
   (b) a support member extending from one side of a lower end of said lower frame section;
   (c) a pair of wheels rotatably secured to lower ends of the frame members of said lower frame section;
   (d) a curved handle secured to an upper end of each frame member of said upper frame section and outwardly disposed therefrom;

(e) hinge means for pivotally connecting said upper frame section to said lower frame section for permitting said upper frame section to pivot to a folded position overlying a side of said lower frame section opposite from said support member;

(f) each curved handle extending along a circumferential portion of each wheel when the cart is in the folded position; and (g) a removable shoulder harness including loops for receiving the handles and straps for attachment to the frame when the cart is in the folded position.

2. The cart according to claim 1 wherein the harness is attachable to a person's body independently of the elongated frame.

3. The cart according to claim 1 wherein the shoulder harness comprises:

(a) shoulder straps, (b) a waist strap, and (c) means, intermediate the shoulder straps and the waist strap, for connecting them together.

* * * * *